Figure 3:
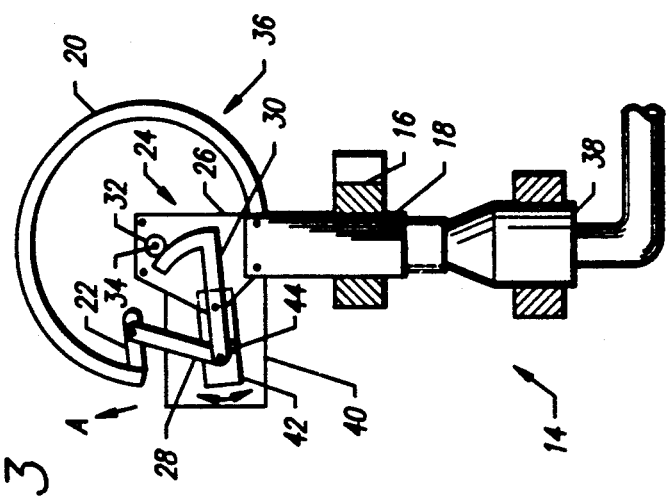

United States Patent [19]

Julien et al.

[11] Patent Number: 5,170,549

[45] Date of Patent: Dec. 15, 1992

[54] PROCESS AND ARRANGEMENT FOR MANUFACTURING A MEASUREMENT DEVICE FOR MEASURING PRESSURE OR TEMPERATURE

[75] Inventors: Hermann Julien, Klingenberg; Klaus Gross, Stockstadt, both of Fed. Rep. of Germany

[73] Assignee: Alexander Wiegand GmbH & Co., Klingenberg, Fed. Rep. of Germany

[21] Appl. No.: 734,507

[22] Filed: Jul. 23, 1991

[30] Foreign Application Priority Data

Jul. 26, 1990 [DE] Fed. Rep. of Germany ....... 4023760

[51] Int. Cl.$^5$ .............................................. G01L 27/00
[52] U.S. Cl. ............................................... 29/407
[58] Field of Search ................... 29/407, 445, 434; 73/4 R, 732, 740, 741, 742, 743

[56] References Cited

U.S. PATENT DOCUMENTS 4,148,123  4/1979  Neubeck et al. ...................... 29/407
4,726,217  2/1988  Berninger et al. ................. 29/407 X

FOREIGN PATENT DOCUMENTS 881113   6/1953  Fed. Rep. of Germany.
2654279  9/1978  Fed. Rep. of Germany.
3143061  5/1983  Fed. Rep. of Germany.
3208626  9/1983  Fed. Rep. of Germany.
255989   4/1988  Fed. Rep. of Germany.

Primary Examiner—Joseph M. Gorski
Assistant Examiner—Peter Dungba Vo
Attorney, Agent, or Firm—Roth & Goldman

[57] ABSTRACT

In the manufacture of a measuring device for pressure or temperature, which exhibits a measuring element, a pointer mechanism, a face dial and a pointer shaft one measures the deflections associated with the shape change of the measuring element for at least three various values of the parameter being measured, and based on the pairs of values consisting of magnitude of the parameter measured and the deflection a set of instructions for arranging the scale markings on the face dial is determined. The scale is inscribed on the face dial according to these instructions by means of a laser printing tool. In this manner the scale can be fitted to the measuring device surveyed and the linearity errors of the indicator can be kept small.

4 Claims, 3 Drawing Sheets

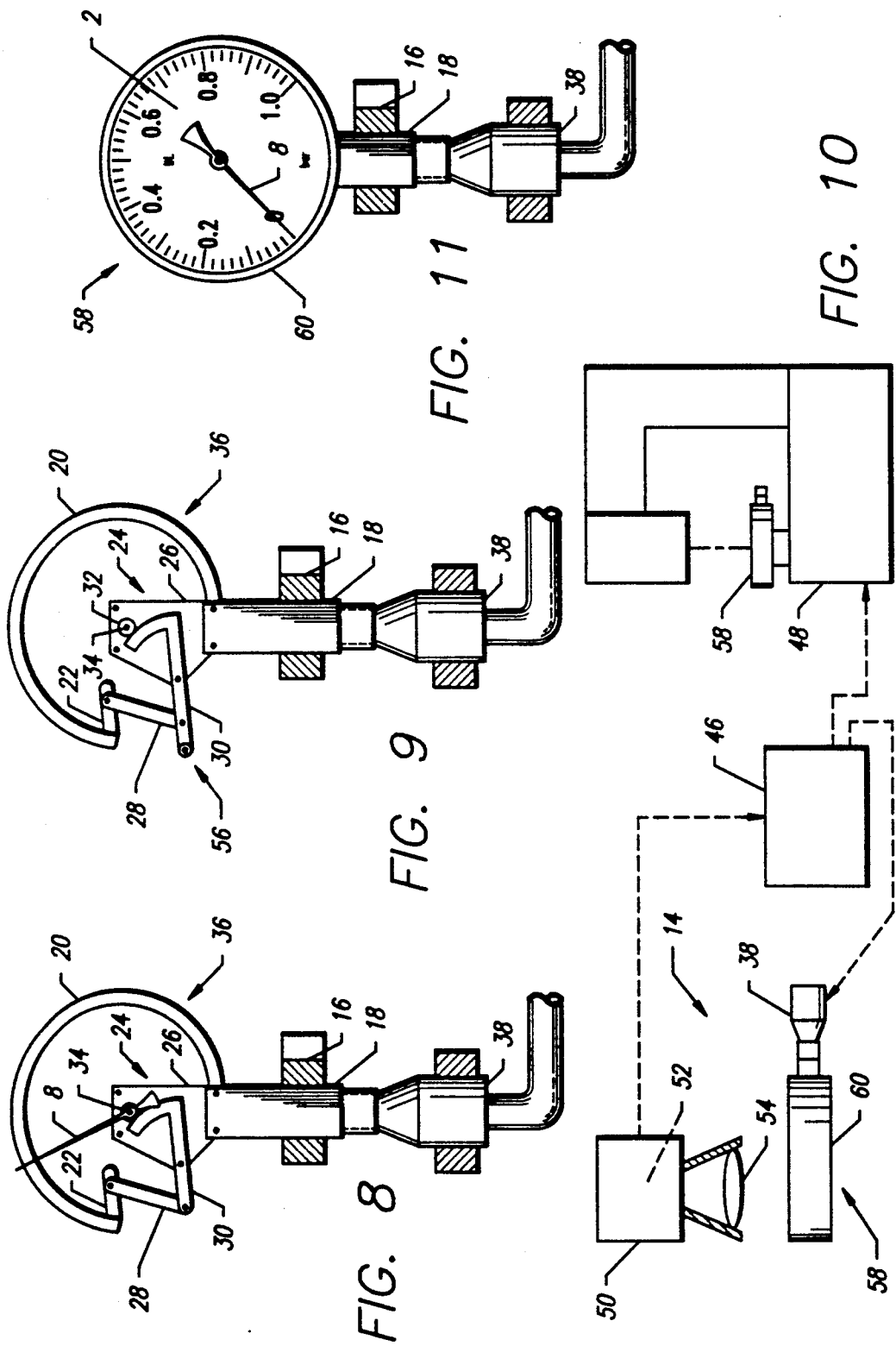

PROCESS AND ARRANGEMENT FOR MANUFACTURING A MEASUREMENT DEVICE FOR MEASURING PRESSURE OR TEMPERATURE

The invention concerns a process for making a measurement device for measuring pressure or temperature according to the preamble of claim 1. Furthermore, the invention relates to an arrangement for carrying out the process according to invention.

In the following the invention is explained based on the manufacture of a tube spring manometer. However, the invention is not limited to the making of a tube spring manometer, and can basically be used in the production of a measuring device for determining pressure or temperature in which the actual measurement value is indicated by the position of a pointer and the value measured is read off by comparing the pointer position with a scale made up of markings on a face dial.

A process with the characteristics of the preamble of claim 1 in conjunction with the manufacture of a tube spring manometer is known, for example from DE-PS 26 54 279. In this known method a face dial is used, in which a ring-shaped scale extends over an angle of 270°. The beginning of the scale is assigned to, for example, zero pressure, and the end of the scale is assigned to nominal pressure. The path which has to be traversed by the pointer to reach nominal pressure is called the range. The calibrations subdivide the scale equidistantly, in order to allow for reading off the measurement values between zero pressure and nominal pressure. In the individual measuring devices it does happen, as a result of finishing tolerances, geometry of the measurement element designed as a tube spring, as well as due to the pointer mechanism coupled to the measurement element, that the pointer position does not follow the applied pressure in exact proportion and that the pointer does not travel the precise 270° range, but tranverses a somewhat shorter or longer path. The indicator errors produced by this are called range errors and linearity errors. It is the task of adjustments to keep these errors small. It is known to perform adjustments manually, whereby acting in particular on the drawbar connecting the free end of the tube spring with the pointer mechanism and acting on the former's joints. This manual adjustment requires much effort and a relatively large amount of time. Furthermore, it is known from the already mentioned DE-PS 26 54 279, to carry out the adjustment in such a way, that one of the joints of the drawbar is mechanically formed only after measuring the deflections of the free end of the tube spring. This method allows for an adjustment which does not require much time and does not place increased demands on specialist skills.

However, diminishing the linearity error remains difficult. Even if the latter is to be set to zero only at one given location on the scale, this requires one to determine a pair of values comprised of the measured parameter and deflection for this location on the scale and the corresponding effects on the geometry of the pointer mechanism. This may already be impossible at this stage due to the mutual dependance of linearity errors and range errors in the particular case. Still higher requirements for linearity, i.e. exact indication of intermediate values on the equidistantly subdivided scale, are practically impossible to realize with the conventional methods.

The object of the invention is to improve the generic process to the point where the range error and the linearity error of the individual measuring device can be maintained as small as possible at low cost. Furthermore, the object of the invention is to make a corresponding arrangement.

As far as the process is concerned, this task is solved by the process according to claim 1. Basically, the process according to invention provides for the face dial to be inscribed with the scale after at least three value pairs of measurement parameter and deflection are determined for the individual measurement device for calibration, such that the scale can be matched exactly and according to invention to the actual deflections for at least three different values of measured parameter, to which the deflections correspond. It is also important for the invention, that the inscribing of the face dial be carried out afterwards with a laser printing tool. This enables inscription or printing of the face dial without previously making a printing block, in a short period of time and under automatic control using the instructions for certain arrangement of markings, which has been determined from the measured deflections. This type of inscribing thus enables writing the scale on the face dial immediately after measuring the value pairs, such that the imprinting can be inserted into the remainder of the manufacturing process of the measurement device without time interruptions over the course of manufacture.

The deflections are preferably measured at 0%, 50% and 100% of the nominal value of the measured parameter for the particular measurement device. To keep the linearity error small one uses the deflections measured between 0% and 100% of the nominal value. The more value pairs are taken into consideration in this region, the more the linearity error of the readout can be reduced.

As follows from the above, in the process according to invention the scale is fitted to the actual pointer movement thus attaining high indication precision, instead of exclusively fitting the movement of the pointer to a given scale to the extent possible. This reduces the requirements and the expenditures during adjustment and represents a further important advantage of the invention. However, the invention does not exclude the performing of an adjustment is in addition to inscribing the face dial in the manner according to invention. In particular, it remains purposeful to adjust for the range error mostly by mechanical means, such that the imprinting according to invention mostly reduces the linearity error.

Another advantage of the process according to invention resides in that the manufacturing and storing costs for the face dials are reduced. In addition to scale markings and the corresponding parameter numbers and measuring units the face dials are usually also inscribed with specifications about the parameter measured, class, manufacturer, any possible standard adhered to and the like. Due to the possible combinations of these specifications, a large number of different face dials are needed, and in the conventional methods these are printed and then have to be kept in storages. Due to the fact that at least a part of these data is written on the face dial in direct conjunction with calibration, the number of face dials which have to be made and kept in storage is reduced. Besides scale markings, the process according to invention makes it possible to simultaneously write at least a portion of the other above named specifications onto the face dial by means of the laser printing tool. In doing this one can even proceed in such a way, as to write on the face dial all of the specifications which are the same color as the markings at the same time as the markings, and the former can simply be imprinted beforehand with the specifications in other desired colors.

As far as the arrangement is concerned, the object of the invention is solved by the arrangement according to claim 9, which distinguishes itself by a measurement arrangement, in which the deflections are measured at various values of the measured parameter, a computer, which receives as input signal the value pairs measured and assigns them instructions for arranging the markings on the scale, and a laser printing tool, which inscribes the scale on the individual face dial based on the instructions.

In an advantageous embodiment of the process according to invention one may, in the case where the measurement element is designed in the form of a tube spring, provide for measuring as deflections the movements of the free end of the tube spring. The tube spring itself contributes to the non-linearity error. Another contribution is added by the pointer mechanism. However, the geometrical conditions of the latter are known or become known during calibration at the latest, such that the pointer positions at the various values of the measurement parameter applied during calibration can be calculated from the deflections or movements of the free end of the tube spring when the aforementioned geometrical relation is taken into account. The measurement of the movements of the free tube spring end offers the advantage, that simultaneously with the process according to invention one can also perform the automatic adjustment according to DE-PS 26 54 279, which is also based on the deflections of the free end of the tube spring.

In an advantageous embodiment of the invention, one can furthermore provide, that according to claims 7 and 8 the entire measurement device including the face dial, pointer, housing and the viewing glass can be assembled, whereby at this point the face dial still lacks the scale and possibly the specifications which are to be written at the same time as the former. The printing is done only later through the viewing glass after the rest of the measurement device is fully assembled.

Figure 4:
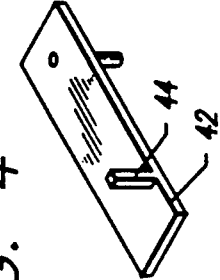
Figure 1:
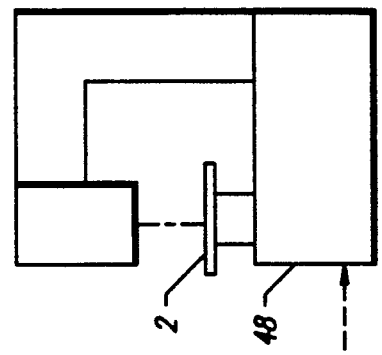
Figure 1:
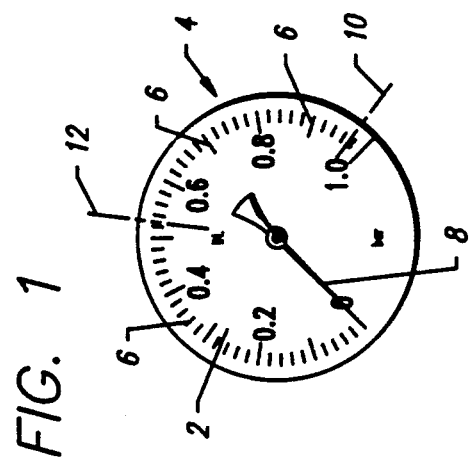
Figure 2:
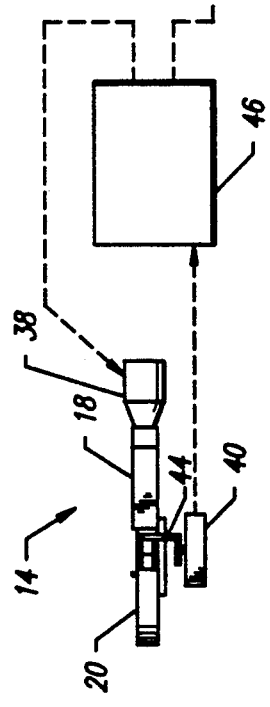
Figure 6:
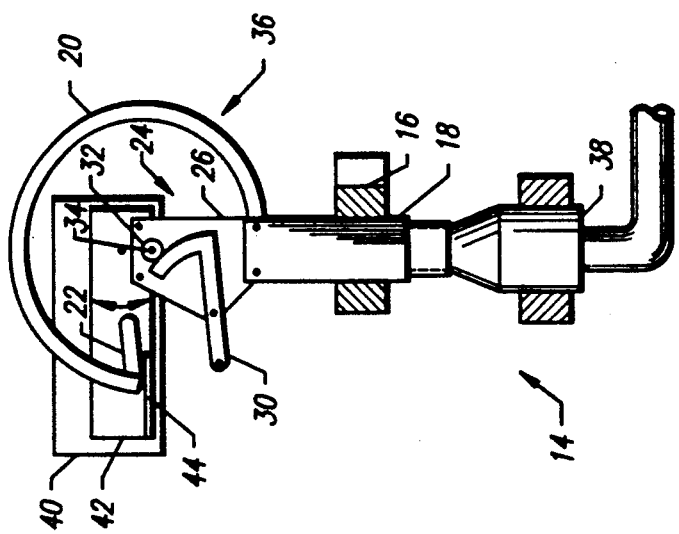
Figure 5:
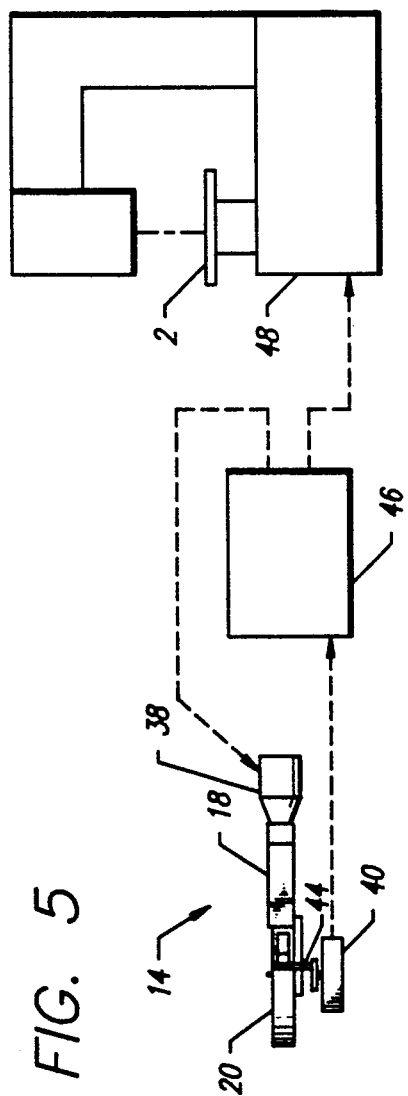
Figure 7:
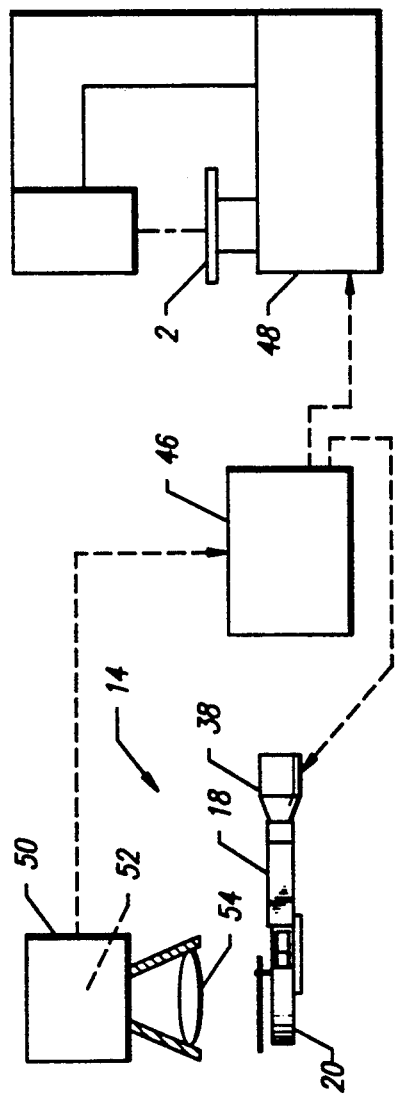

Example embodiments of the invention are illustrated in the drawings and they are explained in more detail in the following. The figures show:

FIG. 1 a front view of a conventional face dial of a tube spring with a corresponding pointer;

FIG. 2 a schematic front view of parts of an arrangement for manufacturing a tube spring manometer;

FIG. 3 a top view of a measurement device of the arrangement according to FIG. 2 as well as a unit consisting of a pointer mechanism and a tube spring of a tube spring manometer inserted into the measurement arrangement;

FIG. 4 a perspective view of a measuring element of the measurement arrangement according to FIG. 3;

FIG. 5 a representation similar to FIG. 2 of a variation of the arrangement according to FIG. 2;

FIG. 6 a representation similar to FIG. 3 of the measurement arrangement according to FIG. 5;

FIG. 7 a representation similar to FIG. 2 of parts of a second embodiment of an arrangement for manufacturing a tube spring manometer;

FIG. 8 a representation similar to FIG. 3 of the measurement arrangement of the set-up according to FIG. 7;

FIG. 9 a representation similar to FIG. 3 of the measurement arrangement of the set-up according to FIG. 7, whereby the unit making up the pointer mechanism and the tube spring is designed differently;

FIG. 10 a representation similar to FIG. 7 of a third embodiment of the arrangement according to FIG. 7; and FIG. 11 a representation similar to FIG. 3 of the measurement arrangement of the set-up according to FIG. 10.

FIG. 1 shows a face dial 2 for a measurement device in the form of a tube spring manometer. The face dial 2 is inscribed with a ring-shaped scale 4, which extends along the edge of the circular face dial 2 over an angle of 270°. The scale 4 includes markings 6 in the form of scale marks as well as some numbers assigned to the markings. The marking with the measurement number "0" is assigned to zero pressure and the marking with the measurement magnitude "1.0" is assigned to the nominal pressure of 1 bar. Furthermore the face dial exhibits further inscriptions, namely the class specification "C1.1.0", DIN standard information, information about the units of measurement "bar" and below it the manufacturer's information. In front of the face dial is arranged a pointer 8. By comparing the position of the pointer with the markings 6 of the scale 4 one can read off the measured and indicated values.

The face dial shown in FIG. 1 is manufactured according to conventional methods, i.e. it has been printed by means of a block plate. The scale extends over exactly 270°. It is designed linearly, i.e. the markings 6 are equidistant from each other. This is based on the assumption, that the pointer moves by exactly 270° between zero pressure and nominal pressure and that its movement or pointer position is directly proportional to the pressure measured. However, in reality this assumption is not satisfied for any particular measurement device. In most cases, the pointer 8 assumes the position represented by the dotted line 10 when the tube spring manometer is exposed to nominal pressure and at half the nominal pressure it assumes the position marked with the double dotted line 12. The difference between position 10 and the marking corresponding to the nominal pressure is the range error. The difference between position 12 and the marking corresponding to half the nominal pressure is the result of the linearity error. In a wider sense, a linearity error is also understood to be the deflection between the actual pointer position and the marking corresponding to the pressure existing at that point, when the scale is not subdivided evenly, but in some other systematic fashion due to another assumption about the pointer mechanism.

In the following are described examples for a process for manufacturing a tube spring manometer, in which the face dial is imprinted by means of a laser printing tool by taking into account the actual pointer position or the position of elements of the tube spring manometer coupled with it for the purpose of calibrating the applied pressures. The face dial produced in this process is similar to the face dial illustrated in FIG. 1. However, in comparison to this one, the markings of the scale along the circumference of the face dial 2 are positioned in such a way, that the reading error is reduced to zero at least at the calibrating pressures. The marking for the nominal pressure is located at pointer position 10, and the marking corresponding to half the nominal pressure is located at the location of pointer position 12, whereby the other markings are displaced in comparison to the conventional face dial according to FIG. 1, i.e. are spaced more closely in the range between half the nominal pressure and the nominal pressure, and are spaced further apart than shown in the region from zero pressure and half nominal pressure. Of course, the marking corresponding to nominal pressure does not need to be shifted with respect to the face dial shown. In fact, it can remain in the same place, namely in the case when the range error has been eliminated by one of the conventional mechanical adjustment measures. In comparison to the face dial shown, different locations exhibit the markings for pressures between zero pressure and nominal pressure.

The process and the arrangement for manufacturing a tube spring manometer is explained in the following based on a first example embodiment with reference to FIGS. 2 through 4.

The named arrangement includes a measurement arrangement 14 with a chuck 16 indicated in FIG. 3. During measurements carried out for the purpose of calibration a spring carrier 18 of a tube spring manometer is mounted in the chuck 16. Attached to the spring carrier 18 is a roughly circular-shaped tube spring 20, to whose free end is affixed an end piece 22. Furthermore, a pointer mechanism 24 is attached to the pipe carrier 11, whose back stop rod 26, drawbar 28, segment lever 30, pointer pinion 32 as well as pointer shaft 34 can be seen in FIG. 3. The tube spring 20 and the pointer mechanism 24 have already been joined together into one unit 36 during production steps which have not been explained in closer detail herein. With the aid of two joints the drawbar 28 is connected with the end piece 22 as well as with one end of the segment lever 30 which is mounted so as to pivot on the stop rod 26, such that the deflection of the end or the end piece 22 of the tube spring 20 due to application of pressure is converted into a swing motion of the segment lever 30 in the direction of arrow A. A toothed segment of the segment lever 30 is engaged with the pointer pinion 32 which is mounted so as to rotated with the pointer shaft 34, such that the swinging motion of the segment lever 30 is transformed into a rotation of the pointer shaft 34. In the finished tube spring manometer this rotation is transferred directly to the pointer 8 mounted on the spring shaft 34.

In addition to the chuck 16 the measurement device 14 includes a means for hooking up the pressure supply 38 as well as a mechanical tracing arrangement 40.

Basically, the connection of the pressure supply 38 consists of a conical inlet nozzle, which can be brought into a pressure-tight fit with a connection opening, not shown, of the tube spring manometer, the former being formed in the spring carrier 18. The connection for the pressure supply 38 can be moved along the direction of the longitudinal axis of the nozzle, such that it can be moved in the direction towards the spring carrier 18, which is mounted in the chuck 16, and in the opposite direction. The connection for the pressure supply 38, on the other hand, is hooked up to a pressure supply, from which the pressure supply connection 38 and thus the tube spring 20 can be supplied with the various pressure values for the purposes of calibration.

The task of the tracing device 40 is to register the deflection of the segment lever 30, which is produced when the tube spring 20 is exposed to pressure, and which causes a change in the shape of the tube spring 20 because the segment lever 30 is joined with the tube spring 20 by means of the drawbar 28. For this purpose the tracing arrangement 40 exhibits a tracing element 42 in the shape of a single-arm lever (also see FIG. 4), which is mounted to pivot on the rest of the schematically shown tracing arrangement 40, and from which protrudes a marking finger 44, which touches the segment lever 30. The marking finger follows the deflection of the segment lever 30, such that the former is converted into a swinging motion of the tracing element 42, such that the tracing arrangement 40 delivers a signal which corresponds to the deflection of the segment lever 30. The axes of rotation of the segment lever 30 and of the tracing element 42 can—as is the case in the example embodiment according to FIG. 3—run coaxially; though this is not necessary, since any other known geometric relation between the both axes of rotation makes possible a determination of the deflection of the segment lever 30 from the swinging motion of the tracing element 42.

The measurement device 14 is controlled by means of a computer 46. This computer 46 controls the exposure of the tube spring 20 to the desired calibration pressures, for example zero pressure, nominal pressure, a pressure equal to 40% of the nominal pressure and a pressure of 70% the nominal pressure. In each case the computer is supplied with the output signal of the tracing arrangement 40, such that the computer disposes of the value pairs corresponding to pressure and deflection. The pointer position corresponding to the measured deflection is calculated from the known mechanical and geometric transfer relations of the pointer mechanism 26. The computer 46 assigns to these pointer positions a certain arrangement of scale markings, as has already been explained beforehand in reference to FIG. 1. This assignment represents instructions for inscribing the face dial 2 to be prepared for the surveyed unit 36.

The inscription itself is carried out by means of the laser printing tool 48 shown in a schematic side-view. Such a laser printing tool itself is known, and thus will not be explained in closer detail. A face dial 2 which has still not been imprinted with a scale 4 is placed in the laser printing tool 48 and it is inscribed according to the instructions delivered from the computer 46. If necessary, further specifications are imprinted on the face dial 2 at the same time. This face dial which is inscribed in accordance with individually surveyed unit 36 is then mounted on this unit according to the conventional methods, after which the pointer 8 is placed on the pointer shaft 34 and the individual apparatus constructed in this way is then connected with the corresponding housing equipped with a viewing glass.

It should be realized from the above description, that by using the laser printing tool 48 the ready printed face dial 2 can be at disposal virtually at the same point in time as the unit 36 is taken out of the measuring arrangement 14.

The result is spring tube manometer with a scale which is individually fitted to the unit consisting of the spring tube 20 and pointer mechanism 24. The indication precision of this spring tube manometer can be made very accurate with respect to the linearity error as well, without increasing adjustment costs due to this. Higher requirements for indication precision can be achieved by recording and evaluating a correspondingly larger number of pairs of deflection and pressure values.

After surveying by means of measurement arrangement 14 the unit 36 consisting of tube spring 20 and the pointer mechanism 24 is no longer altered in its mechanical transfer properties. Usually, the described surveying is preceded by an adjustment. However, a previous adjustment is not required when the range and linearity errors lie in such regions, that one can achieve the indication precision desired by using only the described adaptation of the face dial or of its scale markings.

The computer of the above described example embodiment does not necessarily have to be used in carrying out the described process. In fact, the instructions for imprinting the face dial 2 can be obtained from the pairs of deflection and pressure values by means other than a computer. However, it is understood, that the employment of a computer for this purpose and simultaneously for the control of the measurement arrangement 14 as well as the laser printing tool 48 is particularly purposeful.

In the following will be described a modification of the first embodiment described above in reference to FIGS. 5 and 6. The same reference numbers as in the first version described above are used for the same or corresponding elements of this modification. These same elements and their function will not be explained again in the following. In the subsequent, it will simply be elucidated in what ways the modification according to FIGS. 5 and 6 differs from the first embodiment according to FIGS. 2 through 4.

The only differences reside in that, on the one hand, the drawbar of the segment lever 30 and the end piece 22 are not yet connected by a drawbar and in that one measures the deflections of the tube spring 20 directly from the path of the free end of the tube spring. For this reason, the marking finger 44 of the tracing element 42 lies against the free end of the tube spring 20. The axis of rotation of the tracing element 42 is located in about the geometrical midpoint of the circle described by tube spring 20.

Consequently, the input signals delivered to the computer are the value pairs which consist of the various pressure values and the corresponding deflections of the free end of the tube spring 20. From these pairs of values the computer 46 computes in a way which is not elucidated in any detail herein, but which is explained in DE-PS 26 54 279, the locations at which the joints for the still missing draw bar will be formed. After these locations have been found, the geometry of the pointer arrangement is completely determined and the pointer positions corresponding to the value pairs can be computed. These are then processed, as in the previously described example embodiment, to make instructions for imprinting the face dial.

In the described modification of the first example embodiment it is advantageous that the same value pairs as are used in the commonly known adjustment process, are also used as the basis for imprinting the face dial, such that inscribing the face dial does not require any renewed measurements of the value pairs.

In the following a second version of the example embodiment will be explained based on FIGS. 7 and 8, whereby the same reference numbers are again used for the same or corresponding elements as in the first example embodiment, and only the differences from the first example embodiment are explained, such that the explanations pertaining to the first embodiment modification also apply to the second embodiment modification.

In the second embodiment modification, in contrast to the first example embodiment, the unit 36 consisting of the tube spring 20 and the pointer mechanism 24 is already provided with the pointer 8 in the measurement arrangement 14, and it is the path of the pointer 8 which is measured as the deflection associated with the shape change of the tube spring 20. For this purpose, the measurement arrangement 14 exhibits, instead of a mechanical tracing arrangement, the optoelectronic measurement device 50 illustrated schematically in FIG. 7 and equipped with a CCD semiconductor image recorder 52 which is not shown. The measurement device 50 is arranged above the unit 36 mounted in the choke 16 in such a way, that the unit with the pointer 8 is located in the field of view of the objective 54 of the measurement device 50, such that the objective 54 generates on the CCD semiconductor image recorder an image of the unit 36 under observation including the pointer 8. An optoelectronic measurement device 50 with the properties which are required and described herein is known and will not be explained in detail. The measurement device 50 delivers digitized image information, from which the computer 46 calculates the deflection of the pointer 8 at the various calibrating pressures. In this way one again has pairs of values consisting of deflection and calibration pressure, which the computer 46 converts to instructions for arranging the markings within the scale of the face dial 2. Before the individually imprinted face dial 2 can be fastened on the pointer mechanism 24, one first has to remove the pointer 8 from the pointer shaft 34.

In particular, the advantages of the second modified embodiment according to FIGS. 7 and 8 reside in that it is the actual deflections of the pointer 8 which are measured and not the deflections of a component part which is connected with the pointer mechanically, and in that the deflections are measured without contact by means of the optoelectronic measurement device, whereby ensuring that the object of measurement—in this case unit 36 with pointer 8—is not affected by the process of measurement.

FIG. 9 pertains to a modification of the second example embodiment according to FIGS. 7 and 8. In this modification one element of the pointer mechanism 24, in this particular case the segment lever 30, is provided with a mark 56. In this instance the deflection of the segment lever 30 is recorder by means of the optoelectronic measurement device 50 by tracking mark 56. As in the first example embodiment according to FIGS. 2 and 4, in the modification of FIG. 9 one also measures as the deflection the path of the segment lever 30, whereby this is not done by means of a mechanical tracing arrangement but by means of the optoelectronic measurement device according to FIG. 7. This also brings with it the advantage of performing measurements without contact.

In FIGS. 10 and 11, which serve to explain a third example embodiment, the same reference numbers are used for the same or corresponding element as in the first example embodiment, such that the explanation of the first example embodiment is valid, in so far as no differences are pointed out in the following. The device for carrying out this third example embodiment is the same as the device for carrying out the second example embodiment according to FIGS. 7 and 8.

The particular feature of this third example embodiment is that the entire tube spring manometer 58 including its housing 60 and the viewing glass, which is not represented, is completely assembled before it is exposed to calibration pressures in the measurement arrangement 14. At this point in time the only thing lacking is the imprint which is to be inscribed on the face dial 2 by means of the laser printing tool 48, i.e. in particular the scale 4, as can be seen in FIG. 11. By means of the optoelectronic measurement device 50 the deflections of the pointer 8 are measured as in the second example embodiment according to FIGS. 7 and 8, and then they are processed by computer 46 together with the corresponding pressure values to make up instructions for imprinting the face dial 2. Then the face dial 2 of the otherwise finished tube spring manometer 58 is imprinted in the laser printing tool 48 through its viewing glass, i.e. in particular it is provided with the scale 4. In this case one of the possibilities is to already imprint the marking for zero pressure on the face dial before the face dial is hooked up with the pointer mechanism 24.

The previously explained example embodiments deal with the manufacture of a tube spring manometer. However, in considering the explanations it should be clear, that the design of the measuring element of the measurement device in the form of a tube spring is not crucial, and that the invention can also be used for pressure meters or manometers, whose measuring elements are represented by a diaphragm spring, corrugated pipe, capsule element, coil spring or the like. Furthermore, it can be seen that the invention is not limited to the manufacture of pressure measuring devices, but can also be applied in the making temperature measuring devices, for example bimetallic strip thermometers, spring thermometers or gas pressure thermometers. In these cases the measurements made in measuring arrangement 14 involve deflections due to exposure of the measuring element or, in the case of gas thermometers, of the sensor to various calibration temperatures instead of calibration pressures as in the example embodiments described above.

In manufacturing a measuring device for pressure or temperature exhibiting a measuring element, a pointer mechanism, a face dial and a pointer shaft one measures the deflections associated with the shape change of the measuring element for at least three various values of the magnitude being measured, and based on the pairs of values consisting of magnitude of the parameter measured and the deflection a set of instructions for arranging the scale markings on the face dial is determined. The scale is inscribed on the face dial according to these instructions by means of a laser printing tool. In this manner the scale can be fitted to the measuring device surveyed and the linearity errors of the indicator can be kept small.

We claim:

1. Process for making a measuring device for measuring parameters such as pressure or temperature, said measuring device comprising a measuring element which changes its shape depending on the changes of the magnitude of the parameter measured, a pointer mechanism which converts the change in shape of the measuring element into a rotation of a pointer shaft, a pointer mounted on the pointer shaft and a face dial provided with a scale made up of markings, said process including the steps of assembling the measuring element and the pointer mechanism into one unit, mounting the face dial on said unit assembling the pointer on the pointer shaft, and calibrating said measuring device by measuring the deflections associated with the corresponding shape change of said measuring element of the measuring device for at least three values of the parameter being measured, characterized by the steps of mounting a non-imprinted face dial on the pointer mechanism and measuring element, mounting the pointer thereon, mounting the unit in a housing having a transparent viewing glass, then measuring the positions of the pointer as deflections, and finally using a laser to imprint the face dial through the viewing glass based on the measured pairs of values of parameter magnitude and pointer deflection.

2. The process according to claim 1, characterized by a measuring arrangement (14), in which the deflections are measured for various values of the parameter measured, a computer (46), whose input signals are the value pairs measured and which designs instructions for arranging the markings (6) on the scale (4), and a laser printing tool (48), which inscribes the scale on the particular face dial (2) based on the instructions.

3. The process according to claim 2, characterized in that the measuring arrangement (14) exhibits an optoelectronic measurement device (50) by means of which the deflections are registered free of contact.

4. The process according to claim 3, characterized in that the optoelectronic measuring device (50) exhibits a CCD semiconductor image recorder (52), which delivers digital picture information.

* * * * *